(12) United States Patent
Rahman et al.

(10) Patent No.: US 11,924,717 B2
(45) Date of Patent: Mar. 5, 2024

(54) SYSTEM AND METHOD FOR DATA ANALYTICS FOR COMMUNICATIONS IN WALKIE-TALKIE NETWORK

(71) Applicant: VoiceMe, Inc., San Francisco, CA (US)

(72) Inventors: Ishtiaq Mahmud Rahman, San Francisco, CA (US); Francis G Lacson, Renton, WA (US)

(73) Assignee: VoiceBrain, Inc., San Francisco, CA (US)

( * ) Notice: Subject to any disclaimer, the term of this patent is extended or adjusted under 35 U.S.C. 154(b) by 564 days.

(21) Appl. No.: 17/153,908

(22) Filed: Jan. 21, 2021

(65) Prior Publication Data

US 2021/0227355 A1 Jul. 22, 2021

Related U.S. Application Data

(60) Provisional application No. 62/963,814, filed on Jan. 21, 2020.

(51) Int. Cl.
| | |
|---|---|
| *H04W 4/10* | (2009.01) |
| *G06F 3/16* | (2006.01) |
| *G10L 15/18* | (2013.01) |
| *G10L 15/22* | (2006.01) |

(52) U.S. Cl.
CPC .............. *H04W 4/10* (2013.01); *G06F 3/162* (2013.01); *G10L 15/1815* (2013.01); *G10L 15/22* (2013.01); *G10L 2015/223* (2013.01)

(58) Field of Classification Search
CPC ...... H04W 4/10; G06F 3/162; G10L 15/1815; G10L 15/22; G10L 2015/223
See application file for complete search history.

(56) References Cited

U.S. PATENT DOCUMENTS

| | | | | |
|---|---|---|---|---|
| 9,628,964 | B2* | 4/2017 | Trajkovski | H04W 4/10 |
| 10,416,040 | B1* | 9/2019 | Prescott | G01M 11/33 |
| 10,806,942 | B2* | 10/2020 | Hochstenbach | H04M 1/72454 |
| 10,873,191 | B2* | 12/2020 | Chien | F21V 23/02 |
| 11,012,551 | B2* | 5/2021 | Sun | H04B 17/318 |
| 11,121,513 | B2* | 9/2021 | Chien | A61L 9/03 |
| 2014/0089475 | A1* | 3/2014 | Limont | H04L 63/10 |
| | | | | 709/221 |

(Continued)

FOREIGN PATENT DOCUMENTS

WO WO2019/024719 A1 2/2019

OTHER PUBLICATIONS

International search report and written opinion for PCT/US2021/014259.

*Primary Examiner* — Hai V Nguyen
(74) *Attorney, Agent, or Firm* — AWA Sweden AB; Thomas L. Ewing (57) ABSTRACT

An embodiment of the invention provides a deskless workstation that comprises a network of walkie-talkies connected to a mobile phone that forwards the audio communications to a remote processing device for further processing and to take appropriate actions. The remote device may analyze the audio information to determine what action to perform. An embodiment of the invention may be assembled largely from existing components such as a particular type of audio cable, an Android mobile phone, and a radio application available for Android phones.

17 Claims, 4 Drawing Sheets

(56) References Cited

U.S. PATENT DOCUMENTS

| | | | |
|---|---|---|---|
| 2016/0044522 A1* | 2/2016 | Ludlow | H04L 43/0811 |
| | | | 370/252 |
| 2016/0097525 A1* | 4/2016 | Chien | H02J 7/00 |
| | | | 362/135 |
| 2016/0153650 A1* | 6/2016 | Chien | F21V 33/0004 |
| | | | 362/253 |
| 2017/0054315 A1* | 2/2017 | Chien | F21V 33/0024 |
| 2017/0116813 A1 | 4/2017 | Marincola et al. | |
| 2017/0118003 A1 | 4/2017 | Qu et al. | |
| 2017/0192745 A1 | 7/2017 | Sunstrum | |
| 2017/0238079 A1 | 8/2017 | Smith et al. | |
| 2018/0126185 A1* | 5/2018 | Hochstenbach | H04M 1/72454 |
| 2018/0204565 A1 | 7/2018 | Cohen et al. | |
| 2019/0166444 A1 | 5/2019 | Goldstein | |
| 2019/0341793 A1* | 11/2019 | Chien | F21V 33/0004 |
| 2020/0091746 A1* | 3/2020 | Chien | G06F 1/266 |
| 2020/0244790 A1* | 7/2020 | Sun | H04Q 5/24 |
| 2021/0002170 A1* | 1/2021 | Chien | H05B 45/30 |
| 2021/0389760 A1* | 12/2021 | Liotti | B60W 10/04 |
| 2022/0267205 A1* | 8/2022 | Chien | C03C 3/097 |
| 2023/0051385 A1* | 2/2023 | Ma | G06F 13/385 |

\* cited by examiner

SYSTEM AND METHOD FOR DATA ANALYTICS FOR COMMUNICATIONS IN WALKIE-TALKIE NETWORK

CROSS-REFERENCE TO RELATED APPLICATION

This application claims priority from U.S. Provisional Application 62/963,814, titled "System and Method for Data Analytics for Communications in Walkie-Talkie Network" filed on 21 Jan. 2020. The entire contents of this priority application is incorporated herein by reference.

FIELD

Embodiments of the invention relate to systems that form deskless workstations using audio data received from walkie-talkie networks. More particularly, various embodiments of the invention relate to systems and methods that employ mobile telephones to relay audio conversations from a walkie-talkie network to one or more remote devices that have been configured to process the audio data received from the walkie-talkie network and engage appropriate actions that provide deskless workstation functionality.

BACKGROUND

The following discussion includes information that may be useful in understanding embodiments of the invention. It is not an admission that any of the information provided herein is prior art or relevant to the present invention, or that any publication specifically or implicitly referenced is prior art.

Companies and individuals continuously desire to become more effective and efficient at performing and completing work tasks. Providing workers with appropriate tools for completing their assigned tasks is a critical element of productivity. The ubiquitous office desk evolved from European trading houses of the late 18$^{th}$ Century and was regularized for an expanding army of office workers during the Frederick Winslow Taylor era of industrial efficiency. Apart from new equipment and aesthetic changes, office furniture has not fundamentally evolved in 100 years. Moreover, the traditional design of an office workspace has expanded to other areas where such arrangements may never have been optimal, e.g., hotels, hospitals, and police/fire departments.

In the spirit of Taylor and with an eye for increasing workplace efficiency, it is appropriate to reconsider the extent to which traditional workplace office arrangements could be significantly improved by application of new technologies, particularly the communications technologies that have evolved since the late 19$^{th}$ Century when the Taylorists were actively designing the workspaces that have been conventional for more than a century.

In short, a need exists for more advanced workspaces that can enable workers to perform conventional tasks at an improved rate of performance over the approaches found in the prior art, as well as perhaps tackling new tasks.

SUMMARY OF THE INVENTION

Embodiments of the invention provide a system and method that enables a "deskless workstation" by recording conversations arising in a network of walkie-talkies and transmitting these conversations to an audio processing device that analyzes the recorded conversations and takes appropriate actions. An embodiment of the deskless workstation may be enabled by connecting one of the walkie-talkies in the network of walkie-talkies to a mobile phone having an application configured to receive the walkie-talkie audio transmissions and transmit them to a more powerful computer for processing. After processing the audio files, the more powerful remote computer engages an appropriate set of actions, according to an embodiment of the invention. A further embodiment of the invention may impose an analog-to-digital audio interface in the connection between the walkie-talkie and the mobile phone.

BRIEF DESCRIPTION OF THE DRAWINGS

Figures provided herein may or may not be provided to scale. The relative dimensions or proportions may vary.

DETAILED DESCRIPTION OF AN EMBODIMENT OF THE INVENTION

Embodiments of the invention enable a "deskless workstation" by providing a system that records the conversations arising in a network of walkie-talkies and transmits these conversations to one or more remote audio processing devices that analyzes the recorded conversations, determines the relevant content, and engages appropriate actions. The remote audio processing devices may offer significantly greater computer processing power than that available on a conventional mobile phone.

Embodiments of the deskless workstation may be enabled by using a conventional cable set-up to connect one of the walkie-talkies in the network of walkie-talkies to a mobile phone having an application configured to receive the walkie-talkie audio transmissions and transmit them to another, possibly more powerful computer for processing. The mobile phone and walkie-talkie may also be tethered together using an analog-digital audio interface which enables higher quality recordings of the audio data received from the walkie-talkie network than is provided by an arrangement of conventional cables. After processing the audio files, the more powerful remote computer engages an appropriate set of actions, according to an embodiment of the invention.

For example, a manager may instruct that audio segments recorded from a walkie-talkie network be processed by a remote analytical processor to obtain a given result, e.g., to extract the meaning from a saved audio clip and send a transcript to the manager (or another party), according to an embodiment of the invention. The transcript may be accompanied by an audio file of the recorded conversation. The original audio file may become helpful in a variety of use cases and verify the correctness of the transcript if that becomes an issue.

Similarly, the manager could configure a deskless workstation system such that information (e.g., instructions) in a saved audio clip is processed by a remote analytical processor to determine the audio clip's meaning and then take action on the determined meaning. For example, an audio clip from a user in a network of hotel maintenance workers might contain the instruction: "We need to order more toiletry kits. Authorization: WangX415912." This audio instruction in the hotel walkie-talkie network could be processed by a remote analytical processor to create the instructions for ordering more hotel toiletry kits, send a confirmation message for the order, place the order for the toiletry kits after receiving confirmation, and provide a confirmation copy of the placed order to the appropriate hotel manager.

The deskless workstation can be configured to provide users with a host of services. Deskless workstations may be configured into larger networks of deskless workstations that include other components, including processes configured to perform operations too computationally complex for all but a handful of computing devices and arrays of computing devices.

Figure 1A:
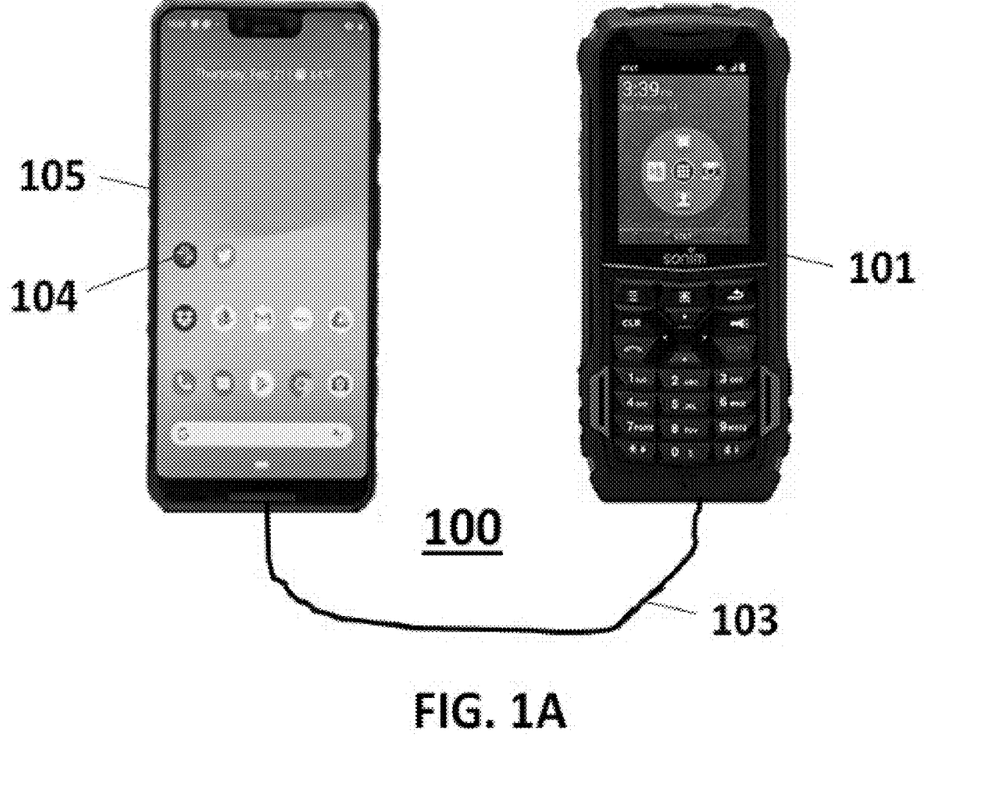
FIG. 1A illustrates a walkie-talkie 101 tethered to a mobile phone 105 having a radio app 104 configured to receive audio communications received by mobile phone 105 from the walkie-talkie 101, according to an embodiment of the invention.

FIG. 1A illustrates a walkie-talkie 101 tethered to a mobile phone 105 having a radio app 104 configured to receive audio communications received by mobile phone 105 from the walkie-talkie 101, according to an embodiment of the invention.

One particular embodiment of the invention comprises a Sonim XP5 walkie-talkie 101 tethered to an Android mobile phone 105 via a cable 103 (or cable combination) having at least one of CTIA or OMTP 23-nm capabilities. Depending on the type/model of the mobile phone 105, the CTIA portion of the cable 103 plugs directly into the mobile phone 105, according to an embodiment of the invention. CTIA stands for the Cellular Telecommunications Industry Association, which has promulgated standards for certain mobile telephony devices. Alternatively, the cable 103 may comprise an OMTP portion for connection to the mobile phone 105. OMTP stands for Open Mobile Terminal Platform and represents a standard that is typically appropriate to older models of Android mobile phones, according to an embodiment of the invention.

The mobile phone 105 has been configured to continuously receive audio data received from the walkie-talkie 101 via the cable 103, according to an embodiment of the invention. In other words, the mobile phone 105 receives the conversations transmitted from the walkie-talkie 101.

Android mobile phones may already be configured to include applications (apps) like the radio app 104 that can process audio data received from walkie-talkies. These apps may be downloaded from an Android app store, which is well-known to those skilled in the art as well as the general public. Likewise, construction of the radio app 104 is also well-known to those skilled in the art.

In some embodiments of the invention, the mobile phone 105 may comprise a different type of mobile phone than an Android phone. The Android phone embodiment described here is intended to be illustrative rather than limiting. In other embodiments of the invention, the mobile phone 105 may even be replaced with another form of computing device that has a capacity for communicating with a walkie-talkie, such as the walkie-talkie 101.

The audio data received by the radio app 104 is directed for transmission to a remote processing device for further processing. As discussed herein, remote processing devices may offer more powerful and faster processing of audio data than is possible by the mobile phone 105.

Figure 4:
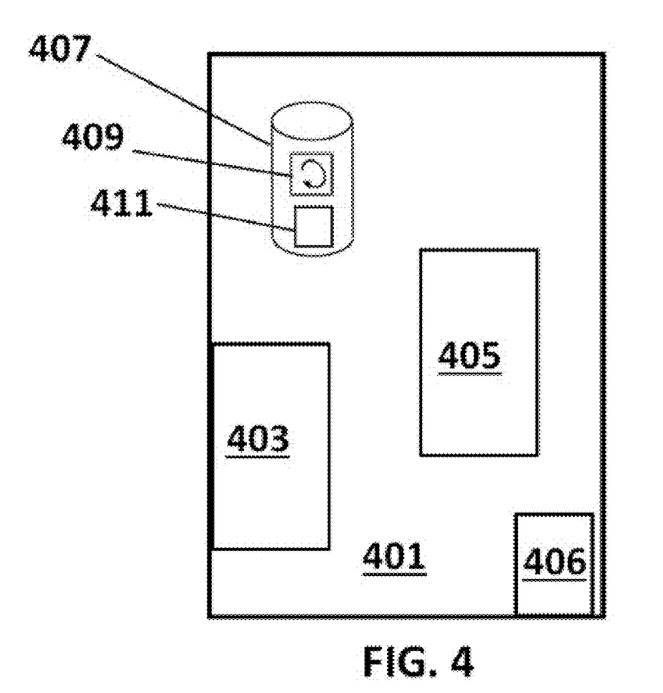

In some embodiments of the invention, the audio data may be transmitted wirelessly from the walkie-talkie 101 to the mobile phone 105. In such embodiments, then the cable 103 is not necessary. FIG. 4 and its associated text describe some possible embodiments in which a wired tether like the cable 103 might not be necessary.

Figure 1B:
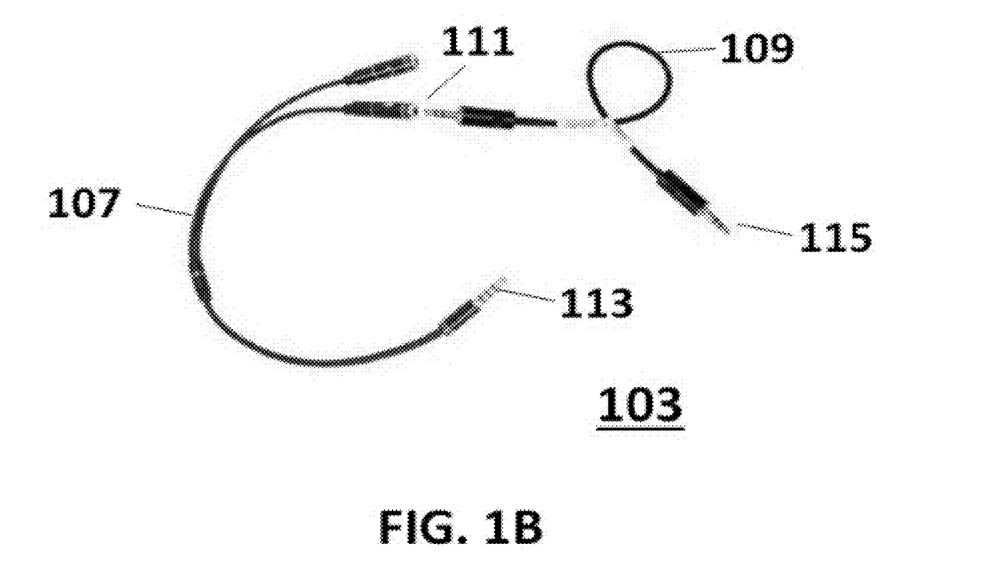
FIG. 1B illustrates a particular configuration for the cable 103 shown in FIG. 1A, according to an embodiment of the invention.

FIG. 1B illustrates a particular configuration for the cable 103 shown in FIG. 1A, according to an embodiment of the invention. As shown in FIG. 1B, the cable 103 may comprise a cable 107 and a cable 109 connected at junction 111.

The cable 107 comprises at least a CTIA or OMTP compatible headphone-mic audio Y splitter cable, according to an embodiment of the invention. The male-end 113 of the cable 107 plugs directly into the mobile phone 105. When connected to the mobile phone 105 using connector 113, the cable 107 effectively instructs the mobile phone 105 to use the microphone function or speaker function of the mobile phone 105.

The cable 109 comprises a Line-to-Mic Attenuator Cable. One end of the cable 109 connects to the cable 107 at junction 111 to form the cable 103. The other end 115 of the cable 109 connects to the walkie-talkie 101. One of the Line-to-mic attenuator cable's 109 male ends connects to the female-mic end of the Y splitter 107 and its other male end 115 connects to the walkie-talkie 101. The combination of cables 107, 109 formed as the cable 103 allow the walkie talkie 101 to send audio data to the mobile phone 105, according to an embodiment of the invention.

Of course, other types of cabling may be used with various embodiments of the invention. Likewise, some embodiments of the invention may be wireless and not require cabling.

Figure 1C:
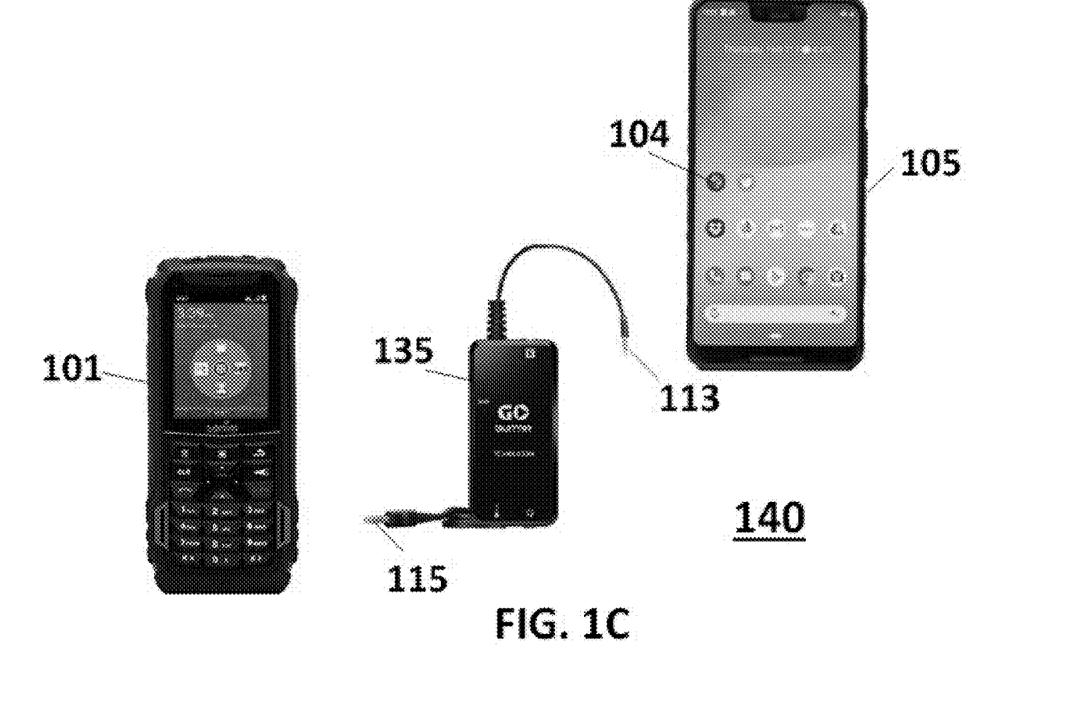
FIG. 1C illustrates a walkie-talkie 101 tethered by an analog-digital audio interface 135 to a mobile phone 105 having a radio app 104 configured to receive audio communications received by mobile phone 105 from the walkie-talkie 101, according to an embodiment of the invention.

FIG. 1C illustrates a walkie-talkie 101 tethered by an analog-digital audio interface 135 to a mobile phone 105 having a radio app 104 configured to receive audio communications received by mobile phone 105 from the walkie-talkie 101, according to an embodiment of the invention.

The analog-digital audio interface 135 represents an alternative hardware setup to the configurations shown in FIGS. 1A and 1B. Application of the audio interface 135 may offer significant improvement to the reliability and quality of the audio data provided to the mobile phone 105. Thus, the system 140 may provide a more reliable and less noisy configuration than the wired configuration shown in FIGS. 1A and 1B, according to an embodiment of the invention.

The specialized analog-digital audio interface 135 may provide improved quality audio data for the mobile phone 105. Analog audio represents conventional audio comprising an analog signal. Digital audio comprises sound that has been recorded in, or converted into, digital form. In digital audio, the sound wave of the audio signal is encoded as numerical samples in continuous sequence. Thus, by providing the mobile phone 105 with a high-quality digital signal, the overall performance of the system 140 may be enhanced.

The system 140 employs the analog-digital audio interface 135, according to an embodiment of the invention. One suitable analog-digital audio interface 135 is the Go Guitar audio interface by TC Helicon, although other audio interfaces may alternatively be employed. The Go Guitar audio interface 135 provides audio outputs for headphones, guitar amp or PA system, and here to the mobile phone 105. One end 115 of the analog-digital audio interface 135 can be connected to the Walkie talkie 101 and the other end 113 can be connected with the mobile phone 105, e.g., through a 3.5 mm cable, according to an embodiment of the invention.

Figure 2:
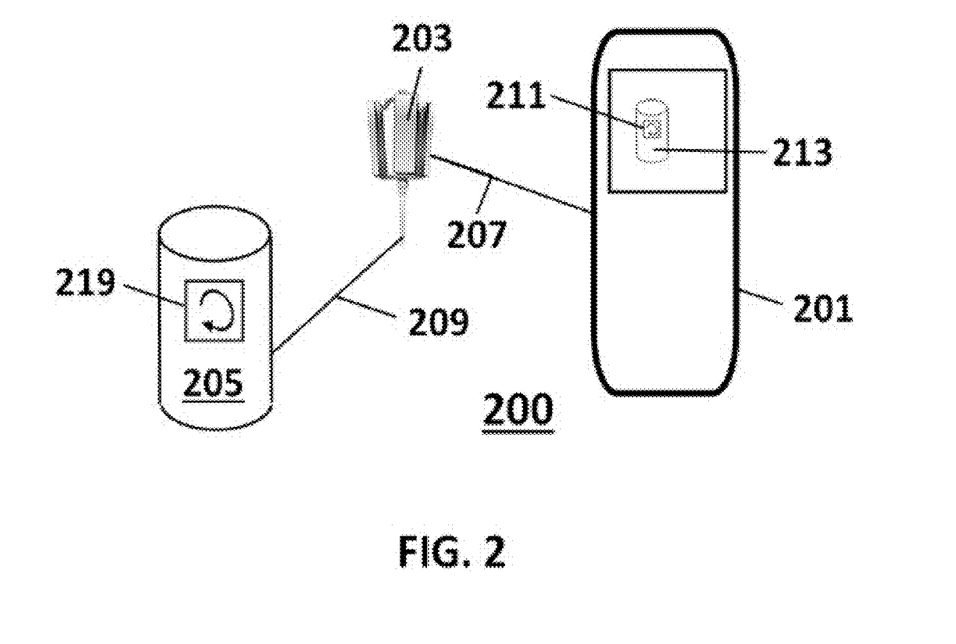
FIG. 2 illustrates an embodiment of the invention in which a mobile phone 201 transmits stored audio data 211 to an external processing device 205, according to an embodiment of the invention.

FIG. 2 illustrates an embodiment of the invention in which a mobile phone 201 transmits stored audio data 211 to an external processing device 205, according to an embodiment of the invention. The mobile phone 201 may have previously stored the audio data 211 in data repository 213 in a manner consistent with the mobile phone 105 that receives audio data from the walkie-talkie 101 as shown in FIG. 1.

The mobile phone 201 engages transmission of the stored audio data 211 to an external processing device 205 using its organic wireless transmitter (e.g., communications module 403 shown in FIG. 4). The transmission may be conducted over the cellular network and/or via the Internet. For example, the stored audio data 211 may be wirelessly transmitted 207 to a remote relay device 203 (e.g., a cellular base station) that then transmits 209 the stored audio data 211 to the external processing device 205 either wirelessly or over another communication path such as the Internet. Once the audio data 211 arrives at the external processing device 205, the audio data 211 is stored as audio segment 219.

In some embodiments of the invention, the mobile phone 201 may transmit directly to a distant device, such as the external processing device 205 if the mobile phone 201 includes a sufficiently powerful transceiver or if the external processing device 205 is in sufficiently close in proximity to the mobile phone 201. One could assume, for example, that in some embodiments, the external processing device 205 itself includes a wireless transceiver sufficiently powerful for the task of receiving communications from one or more mobile phones tethered to a walkie-talkie network, as described in FIG. 1. A small city's fire department, for example, could purchase a cellular base station (e.g., a used cellular base station) that it uses to connect to mobile phones that are themselves tethered to walkie-talkies, thus providing a complete internal communications network that could provide internal communications for the fire department. The external processing device 205 may process the audio data 211 to determine its semantic content, to determine the meaning of the semantic content sufficiently to engage requested actions (e.g., ordering new toiletry kits for a hotel), creating a transcript from the audio data 211 and taking other actions that are within the capabilities of advanced processing devices known to those skilled in the relevant art.

In some embodiments of the invention, conversations received on the walkie-talkie (e.g., the walkie talkie 101 shown in FIG. 1A) may be streamed to the external processing device 205 via the mobile phone 201 where the conversation may be analyzed and processed. In some embodiments of the invention, an entire conversational unit (measured by time duration and/or amount of data and/or completeness of utterance) could be transmitted to the external processing device 205 in one defined data transaction.

Embodiments of the invention may include a user interface that enables the user to engage functionality for transmitting the audio data 211 to the external processing device 205. The user interface could comprise a graphical user interface on the mobile phone 201, a mechanical button on the mobile phone 201, or a mechanical button on the walkie-talkie that sends an appropriate signal to the mobile phone 201, according to an embodiment of the invention.

The user interface could be provided on a remote device (e.g., one of the walkie-talkies in the network) with a subset of commands provided by the radio app (e.g., the radio app 104 shown in FIG. 1A) on the mobile phone 201. So, for example, commands such as "record conversation" could be engaged through the user interface as well as more complicated tasks, such as "make transcript of recording," according to an embodiment of the invention. The transcript might be accompanied by a copy of the original audio file. Attaching the original audio file could be a predetermined variable and/or the user may request that the original audio file be attached. The methods of transmitting the audio file itself are well known to ordinarily skilled artisans.

The mobile phone 201 could be configured to replay the audio data 211 and perhaps even engage the replaying of the audio data 211 on a device other than the mobile phone 201, according to an embodiment of the invention.

Figure 3:
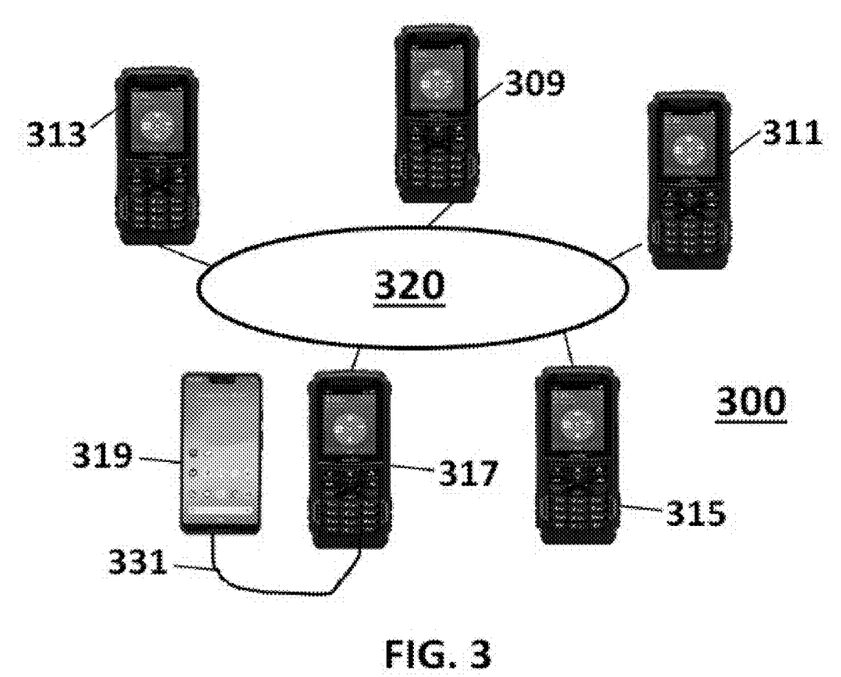
FIG. 3 illustrates a network 300 of walkie-talkies 309-317 whose communications are interlinked 320, according to an embodiment of the invention FIG. 4 provides a block diagram of a mobile phone 401, according to an embodiment of the invention.

FIG. 3 illustrates a network 300 of walkie-talkies 309-317 whose communications are interlinked 320, according to an embodiment of the invention. One of the walkie-talkies 317 in the network 300 is tethered 331 to a mobile phone 319.

The walkie-talkie 317 may be tethered 331 to the mobile phone 319 in the manner described in FIGS. 1A-1C for the mobile phone 105 and the walkie-talkie 101, according to an embodiment of the invention.

Once the walkie-talkie 317 has been tethered 331 to the mobile phone 319, then the interlinked communications 320 among the walkie-talkies 309-317 may be transmitted to the mobile phone 319 via the tether 331. Thus, the interlinked communications 320 may be stored as audio data on the mobile phone 319 and transmitted to a remote processing device for analysis and action, such as the remote processing device 205 shown in FIG. 2.

In some embodiments of the invention, the interlinked communications 320 could include other smartphones (like the mobile phone 105 shown in FIG. 1A) as well as walkie-talkies 309-317. The mobile phones and the walkie-talkies may be configured for audio communications with each other. Some mobile phones (e.g., smartphones) have capabilities for communicating as walkie-talkies. Some other mobile phones (e.g., smartphones) have the ability to operate apps, such as the radio app 104 shown in FIG. 1A and FIG. 10, that enable the mobile phone 105 to communicate in a local audio network such as the interlinked communications 320, according to an embodiment of the invention.

FIG. 4 provides a block diagram of a mobile phone 401, according to an embodiment of the invention. The mobile phone 401 may comprise a wireless communications module 403 (e.g., a transceiver), a processor 405, a data storage component 407, and a receptacle 406 that accepts a cable, such as the cable 103 shown in FIG. 1, that enables receipt of audio data from a walkie-talkie, such as the walkie talkie 101 shown in FIG. 1, according to an embodiment of the invention. Many if not most of these components may be conventional components typically found on mobile phones, according to an embodiment of the invention. Thus, the mobile phone 401 could be the mobile phone 105 shown in FIG. 1A. The data storage component 407 may store data such as audio data 409 and a radio app 411.

In conjunction with recording conversations from a network of walkie-talkies, such as shown in FIG. 1A, the data storage component 407 holds audio data 409 received from a walkie-talkie (e.g., the walkie-talkie 101 shown in FIG. 1A), according to an embodiment of the invention. The processor 405 directs the storage of incoming audio data from the walkie-talkie to the data storage component 407.

The audio data may be stored circular buffer in the data storage component 407, according to an embodiment of the invention. Thus, recording does not start over when new audio data 409 arrives, instead the data storage component 407 just changes the position of a pointer to where the data starts and whether it has passed the buffer (wrapped). For example, assume that there are 100 data positions allocated to instances of audio data 409 in the data storage component 407, the data storage component 407 will start at position 0, then 1, 2, and so forth until it hits 99, then instead of reaching 100, the data storage component will return to position 0 and set a "wrapped" variable to true (and so forth) so at any point, various applications may check the data to will to see if wrapped is true, and, if so, then the data storage component 407 will return the data from position+1 to position in a manner known to ordinarily skilled artisans.

The audio data may also be stored in a loop, such that the loop records over early portions of audio data at a fixed interval, e.g., every 10 seconds, according to an embodiment of the invention. Such an interval would typically correspond to an interval for sending audio data to a remote processing device, such as the remote processing device 205 shown in FIG. 2. In other words, once a set of audio data 409 has been transmitted off the mobile phone 401, then a new set of audio data 409 may be recorded over the old data, according to an embodiment of the invention.

The processor 405 may send the compressed audio data (e.g., the audio data 409) to a remote data processing device, such as the data processing device 205 shown in FIG. 2, according to an embodiment of the invention.

The processor 405 may be programmed to understand tasks that it can complete itself and tasks that should be completed by a remote processing device, such as the remote processing device 205 shown in FIG. 2. This understanding of pertinent tasks may be controlled or directed by the radio app 411, according to an embodiment of the invention.

The radio app 411 may be enabled for operation on, or in conjunction with, the processor 405 on the mobile phone 401, according to an embodiment of the invention. Thus, a user may obtain the radio app 411 by accessing mobile phone applications from a repository, such as the Apple AppStore, that provides the radio app 411 that instructs the processor 405 how to receive and store data from a walkie-talkie, such as the walkie-talkie 101 shown in FIG. 1A, and transmit audio data 409 from the mobile phone 401 to a remote processing device, such as the remote processing device 205 shown in FIG. 2, according to an embodiment of the invention. In other embodiments, the radio app 411 may be pre-stored on the mobile phone 401.

Among other things, the radio app 411 continuously analyses audio data (e.g., the audio data 409) from the walkie-talkie (e.g., the walkie-talkie 101 shown in FIG. 1A), according to an embodiment of the invention. When the audio goes above a certain amplitude threshold (e.g., volume) the radio app 411 marks in a data file, possibly the audio file itself, where the threshold was exceeded (e.g., via a get to the current system timer) and begins saving the audio data in an in-memory circular buffer, e.g., in the data storage component 407.

When the volume in the audio data drops below a predetermined level for a predetermined amount of time (e.g., representing a speech timeout) or reaches a predetermined maximum speech duration, then as long as the audio data comprises a minimum duration, then the radio app 411 checks to see if the audio data is silence, noise, static, or voice using a client-side machine learning algorithm (e.g., ML Kit from Firebase or the equivalent). If the client-side machine learning algorithm returns a high enough confidence that the audio data is voice then, the radio app 411 sends the data to an external processing device (e.g., the external processing device 205 shown in FIG. 2) for analysis and automatic speech recognition.

The radio app 411 may include several settings that can either be manually or automatically set (such as amplitude threshold, minimum duration, speech timeout, maximum speech duration, speech padding, minimum confidence, etc.) Coding such functionality in the radio app 411 is within the skill of an ordinary artisan.

With speaker recognition by either the radio app 411 or the external processing device 205, the user voices should be "enrolled" in order to be properly recognized. For example, approximately 30 seconds of voice samples from each user is often sufficient. As a back-up to automatic recognition, sampling of the audio clips by trained staff can also be used to manually tag/label and correct each utterance and set which person(s) are in each clip after the audio clip passes through the automatic speech recognition module to further enhance the audio data training which makes the automatic speaker recognition even more accurate.

With walkie-talkies, having multiple speakers in the same audio data file is less of an issue, and when the walkie-talkies are interlinked (e.g., the interlink 320 shown in FIG. 3), the radio app 411 may be configured to detect signatures from each walkie-talkie (e.g., the walkie-talkies 309-317 shown in FIG. 3) that allows the audio files to be separated by walkie-talkie, according to an embodiment of the invention.

Similarly, in terms of speaker diarization, when a need for this arises, the audio data file may pass through an API in the external processing device 205 which separates different speakers by returning the following:

Transcript

Confidence, and

An array of start time, end time, speaker tag, and words.

The processor 405 may comprise a CPU, or a like computing device, or may alternatively comprise a simple circuit that directs the operations of the various components, according to an embodiment of the invention. The processor 405 may access data and/or execute software applications like the radio app 411, according to an embodiment of the invention. A skilled artisan will appreciate that many software applications known in the art may be utilized by the processor 405.

The data storage component 407 may comprise a non-transitory memory, such as RAM, flash, ROM, hard drive, solid state, drive, optical media and the like. The data storage component 407 may also include various types of data, such as media, music, software, and the like. For example, the data storage component 407 may store incoming audio data from a walkie-talkie as compressed audio files that may be transmitted to an external processing device in a burst, according to an embodiment of the invention. The data storage component 407 may also be configured to hold stored audio communications in a loop recording as discussed above, according to an embodiment of the invention.

The wireless communications module 403 can be implemented using a hardware combination (e.g., driver circuits, antennas, transceivers, modulators/demodulators, encoders/decoders, and other analog and/or digital signal processing circuits) and software components. Multiple wireless communication protocols and associated hardware can be incorporated into the wireless communications module 403, according to an embodiment of the invention.

The wireless communications module 403 typically includes functionality to communicate bi-directionally via a wireless network. In a conventional embodiment, the wireless network comprises a cellular network. The wireless network may typically comprise wireless technologies and protocols such as Global System for Mobile Communications (GSM), Code Division Multiple Access-One (cdmaOne), Time Division Multiple Access (TDMA), PDC, Japan Digital Cellular (JDC), Universal Mobile Telecommunications System (UMTS), Code Division Multiple Access-2000 (cdma2000), and Digital Enhanced Cordless Telephony (DECT).

The wireless communications module 403 may be configured to transmit highly condensed audio files, such as a compressed file "burst," according to an embodiment of the invention. The transmissions of these bursts may be directed by the processor 405 from audio data 409 stored in the data storage component 407 and directed towards an external device. Once the highly dense data transmission has been completed, then the mobile phone 401 may reduce electrical power consumption by the mobile telephone's batteries. The rapid burst of highly dense data transmission, as opposed to the conventional method of sending data files in a streaming manner, may consume less battery power in the mobile phone 401 in some device configurations.

For embodiments in which a tether (e.g., the cable 103 shown in FIG. 1A) between the mobile phone 401 and the walkie-talkie (e.g., the walkie-talkie 101 shown in FIG. 1A) is not needed, the wireless communications module 403 may include structural and functional components known in the art to facilitate wireless communication with another device such as a walkie-talkie. The wireless communications module 403 can include RF transceiver components such as an antenna and supporting circuitry to enable data communication over a wireless medium, e.g., using Wi-Fi (IEEE 802.11 family standards), Bluetooth® (a family of standards promulgated by Bluetooth® SIG, Inc.), or other protocols for wireless data communication. In some embodiments, the wireless communications module 403 can implement a short-range sensor (e.g., Bluetooth®, BLE or ultra-wide band). Bluetooth® technology provides a low-cost communication link. The Bluetooth® transceiver in an embodiment of the wireless communications module 403 may be configured to establish a wireless data link with a suitably equipped walkie-talkie.

Likewise, in some embodiments, the wireless communications module 403 can provide near-field communication ("NFC") capability, e.g., implementing the ISO/IEC 18092 standards or the like. NFC can support wireless data exchange between devices over a very short range (e.g., 20 centimeters or less). NFC typically involves a near field magnetic induction communication system that provides a short range wireless physical layer that communicates by coupling a tight, low-power, non-propagating magnetic field between devices, e.g., a mobile phone and a walkie-talkie. In such embodiments, the wireless communications module 403 may include a transmitter coil to modulate a magnetic field which is measured by means of a receiver coil in another device, e.g., a walkie-talkie.

In a similar manner, in some embodiments, the wireless communications module 403 can have an ultrasound transducer function, receiving ultrasound data communications and translating them into an electronic signal. Ultrasound communications may offer lower power than some other modes of wireless communications. The wireless communications module 403 may also be configured to translate an electronic signal into an ultrasound signal for transmission to another device, such as a walkie-talkie, according to an embodiment of the invention.

Figure 5:
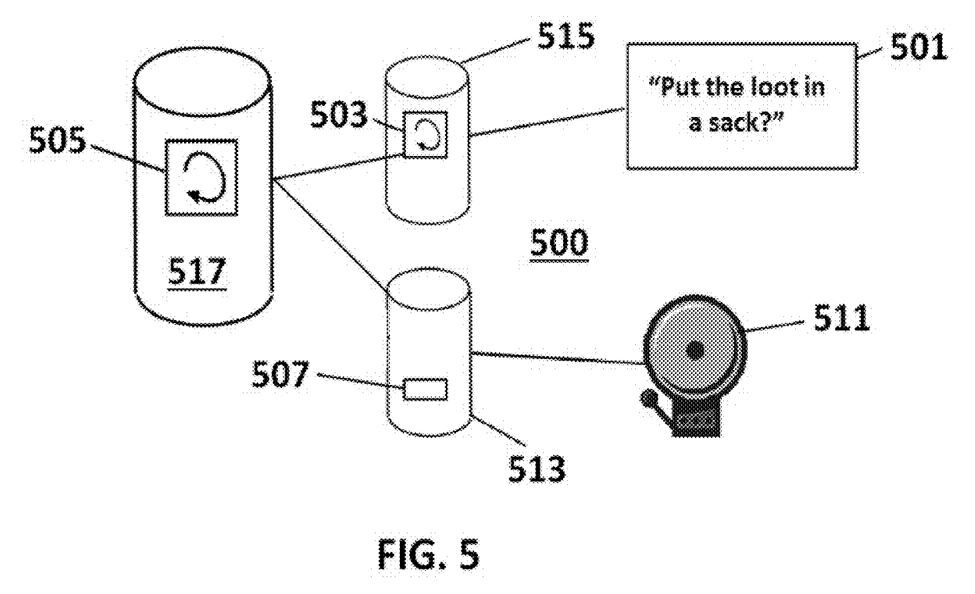
FIG. 5 illustrates an embodiment of the invention in which an audio data file 503 (e.g., an audio segment 409 transmitted from the mobile phone 401 shown in FIG. 4) can be analyzed to engage an action as part of a deskless workstation, according to an embodiment of the invention.

FIG. 5 illustrates an embodiment of the invention in which an audio data file 503 (e.g., an audio segment 409 transmitted from the mobile phone 401 shown in FIG. 4) can be analyzed to engage an action as part of a deskless workstation, according to an embodiment of the invention. Actions and tasks that may be amenable to processing outside a mobile phone include but are not limited to voice authentication, artificial intelligence, speech recognition, and real-time translation.

FIG. 5 illustrates the engagement of an action shown by a remote analytical device 517, according to an embodiment of the invention. A system designer need not necessarily employ a separate remote analysis device to carry out these functions, which could for some use cases be performed on a single server, e.g., the remote processing device 515. The depiction of two remote processing devices 515, 517 here is provided as a convenience of explanation rather than a technical necessity for all embodiments of the invention. Each remote analytical device 515, 517 includes a processor configured to perform the calculations and functions described in order carryout a transformation of the audio data 503, which has been transmitted from a mobile phone such as the mobile phone 105 shown in FIG. 1A, according to an embodiment of the invention.

Assume, for example, that a robbery is in progress at a bank connected into a walkie-talkie communications network, e.g., the walkie-talkie communication network 300 shown in FIG. 3. A clerk has asked a robber if she should "Put the loot in a sack?" The remote analytical device 517 already has a list of key words that include "loot" and "sack" and a context for this occurrence of words in an utterance, along with other indicia of a robbery in progress. The clerk may or may not have been previously alerted to the existence of these keywords in the backend processor (e.g., the clerk may know to say words like these in the event of a robbery to signal a request for help).

The question "put the loot in a sack?" is picked up by the microphone on a walkie-talkie in a walkie-talkie network, such as the walkie-talkie network 300 shown in FIG. 3. One of the walkie-talkies in the network is tethered to a mobile phone (e.g., the mobile phone 319 shown in FIG. 3) that has been configured to transmit audio data to the remote processing device 515. The question "Put the loot in a sack?" arrives in the remote processing device 515 as audio data 503.

The remote processing device 515 resides in a network of processors, according to an embodiment of the invention. Assume, for example, that the remote processing device 515 acts as a gatekeeper for the network of powerful processors. Assume that the remote processing device 515 selects remote analytical device 517 for semantic analysis of the audio data 503. The audio data 503 is stored on the remote analytical device 517 as audio data 505.

In processing the audio data 505, the remote analytical device 517 comes to understand that the question "Put the loot in a sack?" indicates that a robbery is in progress at a location in the walkie-talkie communications network. The remote analytical device 517 then further analyzes the communications to determine which walkie-talkie in the walkie-talkie communications network received this statement. Once this task has been accomplished, then the remote analytical device 517 determines the location of the walkie-talkie.

The external processor 517 then transmits the information that a bank is being robbed to another remote processor 513 that has been configured with a program 507 designed to handle such emergencies. The remote processor 513 engages an alarm function 511 that may include notifying appropriate law enforcement agencies and taking other predetermined actions. The alarm function 511 is likely much more than a conventional ringing bell and may possibly not involve an audible alarm at all.

For other audio messages, the remote analytical device 517 can direct the performance of other tasks, such as constructing a transcript of the audio data 211. The remote analytical device 517 can analyze the audio data 211 to produce a transcript. Conventional audio-to-speech technologies may be employed to produce the transcript. The transcript may be stored at an appropriate location, e.g., the remote processing device 515. A copy of the audio file may also be stored with the transcript.

As mentioned previously, a user may employ natural language processing to request performance of a task. The user may say something like "We need to order more toiletry kits. Authorization: WangX415912," which is eventually stored as audio data 503. The natural language processing on the external processor 515 may recognize "we need more toiletry kits" as the clipped message, and "WangX415912" as an authorization code that identifies a specific worker at a hotel in the walkie-talkie network. Thus, in this example, an order will be placed for more toiletry kits with an appropriate supplier, further documenting the deskless workstation concept.

The processors 515, 517 may perform conventional audio-to-text processes and may possibly be enhanced by converting text into the specific instructions used to control machines where necessary. Conventional natural language processing can be configured by an ordinary artisan in the speech processing arts to perform such processing.

Using voice profiles (e.g., voice profiles stored in the remote processing device 515, a processor in the remote processing device 515 can employ noise cancellation to identify a very specific sound in a haze of noise (e.g., picking a particular person out in a crowd). So, for example, assume a user of a walkie-talkie in a walkie-talkie network is working crowd control at a noisy concert. Assume further that the remote processing device 515 has a voice profile of the user. By applying the voice profile for the user stored in the remote processing device 515, the data storage component's noise cancellation process can use the voice profile as a filter to cancel sounds not fitting the voice profile and thereby allowing the user's voice to be clearly heard and processed for further information content.

Voice profiles could take a number of different formats but typically include information regarding the tonality, cadence, and frequency response of the person associated with the voice profile. Creating such profiles are not a part of the invention herein; however, such voice profiles can be created by having a person record a small number of sentences and then analyzing the response to derive the essential characteristics of the person's voice. Embodiments of the remote processing device 515 could obtain and store a large number of voice profiles for users and potential users of walkie-talkies in the network. Voice profiles are one representative embodiment of an audio profile, which could be a similar profile for some sound (human, animal, machine, etc.) that is amenable to being used as a filter; thus, the voice profiles discussed herein are representative examples of audio profiles. Enhancement of a speaker's voice can be performed in a number of ways. For example, from a spectrogram of a speech, the pitch range, intonational pattern, voice quality, dialectal traits of the speaker can be obtained. In other words, the characteristics of the speaker's voice or voice biometrics can be gleaned.

If the remote processing device 515 has a database of different voice profiles (e.g., based on voice biometrics), then the remote processing device 515 can identify a particular speaker in a speech sample. Once the speaker of interest is determined, then the incoming sound captured by the walkie-talkie can be filtered by the characteristics of the speaker of interest and that received sound signal can be amplified under the direction of the processor and all other sounds can be filtered or diminished. Using statistical models of speech and noise, once the remote processing device 515 knows the temporal and spectral characteristics of speech of interest, the processor can engage the filtering out of all other sounds.

The remote processing device 515 may include a digital signal processor (DSP). In various embodiments of the invention, the DSP may perform (or assist in) a number of functions, such as noise cancellation and speech recognition. Thus, the audio data may also be communicated to the DSP, and/or a voice recognition chip, and/or other apparatus to determine the type of environment that the user is located in (e.g., dense urban area, barren wilderness, etc.) and allow the remote processing device 515 to make an appropriate action.

Any number of tasks may be performed on the remote processing device 515, according to an embodiment of the invention. Tasks that may be most amenable to execution on the remote processing device 515 are tasks that require accessing large databases.

Various embodiments of the invention have been described in detail with reference to the accompanying drawings. References made to particular examples and implementations are for illustrative purposes and are not intended to limit the scope of the invention or the claims.

Many types of electronic components may be employed in the devices discussed above. For example, in various embodiments, the mobile telephone may include microelectronics, nanoelectronics, micro-circuitry, nano-circuitry and combinations thereof. It should be apparent to those skilled in the art that many more modifications of the mobile telephone and other devices besides those already described are possible without departing from the inventive concepts herein.

Headings and sub-headings provided herein have been provided as an assistance to the reader and are not meant to limit the scope of the invention disclosed herein. Headings and sub-headings are not intended to be the sole or exclusive location for the discussion of a particular topic.

While specific embodiments of the invention have been illustrated and described, it will be clear that the invention is not limited to these embodiments only. Embodiments of the invention discussed herein may have generally implied the use of materials from certain named equipment manufacturers; however, the invention may be adapted for use with equipment from other sources and manufacturers. Equipment used in conjunction with the invention may be configured to operate according to conventional protocols (e.g., Wi-Fi) and/or may be configured to operate according to specialized protocols. Numerous modifications, changes, variations, substitutions and equivalents will be apparent to those skilled in the art without departing from the spirit and scope of the invention.

It should be noted that while many embodiments of the invention described herein are drawn to a smart wireless mobile telephone, various configurations are deemed suitable and may employ various computing devices including servers, interfaces, systems, databases, agents, engines, controllers, or other types of computing devices operating individually or collectively. One should appreciate that any referenced computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed mobile telephone.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used herein, and unless the context dictates otherwise, the terms "ambient noise" and "ambient sound" have been used synonymously. Similarly, "sound" and "noise" have been used synonymous, except where the context shows a difference in meaning, e.g., "meaningful sound from mere noise." Likewise, "coupled to" is intended to include both direct coupling (in which two elements that are coupled to each other contact each other) and indirect coupling (in which at least one additional element is located between the two elements). Therefore, the terms "coupled to" and "coupled with" are used synonymously. The terms "coupled to" and "coupled with" are also used euphemistically to mean "communicatively coupled with" where two or more networked devices are able to send or receive data over a network.

We claim:

1. A deskless workstation system, comprising:
    a plurality of walkie-talkies forming an audio communication network;
    a mobile phone having a radio app;
    a cable having a first end connected directly to a walkie-talkie of the plurality of walkie-talkies with one of a TRS connector and a TRRS connector and a second end connected directly to the mobile phone with one of a TRS connector and a TRRS connector, the cable transmitting raw audio data from the audio communication network from the walkie-talkie of the plurality of walkie-talkies to the radio app on mobile phone,
    wherein the radio app on the mobile phone transmits received raw audio data to a remote computer for audio processing.

2. The deskless workstation of claim 1 wherein the cable further comprises an analog-digital audio converter interposed between the first end of the cable and the second end of the cable, wherein the analog-digital audio converter converts the raw audio data from raw analog audio data to raw digital audio data received from the walkie-talkie of the plurality of walkie-talkies.

3. The deskless workstation of claim 1 wherein the cable further comprises:
    a first cable having a first connector configured to plug into the mobile phone and a second connector configured to connect to another cable, wherein the first connector of the first cable is the one of a TRS connector and a TRRS connector; and
    a second cable having a first connector configured to connect to the second connector of the first cable and a second connector configured to connect to the walkie-talkie of the plurality of walkie-talkies, wherein the second connector of the second cable is the one of a TRS connector and a TRRS connector.

4. The deskless workstation of claim 3 wherein the first cable comprises at least one of CTIA or OMTP compatible headphone-mic audio cable.

5. The deskless workstation of claim 3 wherein the second cable comprises a line-to-mic attenuator cable.

6. The deskless workstation of claim 1, further comprising:
    a circular buffer that stores received raw audio data in the mobile phone under the direction of the radio app, such that the circular buffer records over previously stored raw audio data after reaching a predefined memory allocation.

7. The deskless workstation of claim 6 wherein the radio app directs transmission of the received raw audio data to the remote computer for audio processing before the circular buffer reaches the predefined memory allocation.

8. The deskless workstation of claim 1 wherein the radio app directs transmission of the received raw audio data to the remote computer via one of at least a cellular network and the internet.

9. The deskless workstation of claim 8 wherein the remote computer analyzes the received raw audio data to determine semantic content within the received raw audio data, identify actions requested in the semantic content of the received raw audio data, and engage actions to complete the identified actions.

10. The deskless workstation of claim 8 wherein the remote computer analyzes the received raw audio data to create a transcript of words contained in the received raw audio data.

11. The deskless workstation system of claim 1, wherein the remote computer determines by that an alarm condition has occurred based on analysis of the processed audio data, further comprising:
    an alarm that activates upon receipt of the alarm condition from the remote computer.

12. A method for operating a deskless workstation, comprising:
    receiving raw audio data in a walkie-talkie of a plurality of walkie-talkies forming an audio communication network;
    transferring the raw audio data from the walkie-talkie of the plurality of walkie-talkies to a mobile phone directly over a cable having one of a TRS connector and a TRRS connector connected to the walkie-talkie of the plurality of walkie-talkies and the cable having one of a TRS connector and a TRRS connector connected to the mobile phone;
    receiving the raw audio data in a radio app located on the mobile phone from the walkie-talkie of the plurality of walkie-talkies;
    transferring the raw audio data from the mobile phone to a remote computer;

processing the received raw audio data in the remote computer to identify commands contained in the processed audio data.

13. The method for operating a deskless workstation of claim 12, the method further comprising:
translating raw audio data from raw analog audio data to raw digital audio data in an analog-digital converter transposed in the cable between the one of a TRS connector and a TRRS connector connected to the walkie-talkie of the plurality of walkie-talkies and the one of a TRS connector and a TRRS connector connected to the mobile phone.

14. The deskless workstation method of claim 12, the method further comprising:
storing received raw audio data in a circular buffer in the mobile phone under the direction of the radio app; and
recording over previously stored raw audio data in the circular buffer after reaching a predefined memory allocation.

15. The deskless workstation method of claim 12, further comprising:
analyzing by the remote computer the processed digital audio data to determine semantic content within the processed audio data and identify requested actions in the semantic content of the processed audio data; and
engage completion of the identified requested actions.

16. The deskless workstation method of claim 12, further comprising:
analyzing the processed audio data by the remote computer to create a transcript of words contained in the received audio data.

17. The deskless workstation method of claim 12, further comprising:
determining by the remote computer that an alarm condition has occurred based on analysis of the processed audio data; and
generating an alarm based on the alarm condition.

\* \* \* \* \*